United States Patent Office 3,215,757
Patented Nov. 2, 1965

3,215,757
COMPOSITIONS COMPRISING EPOXY-CARBOX-YLIC ACID CONDENSATION PRODUCTS AND ACRYLATE POLYMER
James R. Scheibli, Oakland, and Herbert A. Newey, Lafayette, Calif., assignors to Shell Oil Company, New York, N.Y., a corporation of Delaware
No Drawing. Filed Feb. 6, 1961, Ser. No. 87,109
7 Claims. (Cl. 260—837)

This application is a continuation-in-part of application Serial No. 608,681, filed September 10, 1956, now U.S. 2,970,983.

This invention relates to new compositions of matter and to their preparation. More particularly, the invention relates to new compositions containing epoxy-containing condensates prepared from polyepoxides and certain acidic materials, and to their use, particularly for the preparation of surface coating compositions.

Specifically, the invention provides new and particularly useful compositions comprising a mixture of (1) a solvent soluble epoxy-containing reaction product of a polycarboxylic acid or anhydride with at least 1.5 times the chemical equivalent amount of a polyepoxide containing more than one vic-epoxy group, and (2) a dissimilar film-forming resinous product, and particularly an acrylate polymer, vinyl polymer, alkyd resin, urea or melamine resin or phenolic resin.

Many synthetic resinous products, such as acrylate polymers, have properties which make them potentially useful in the preparation of surface coating compositions. It has been found, however, that films prepared from many of these synthetic products are quite brittle and lack the distensibility required for most coatings. In addition, many of them have limited resistance to water or limited adhesion to metal surfaces. Attempts have been made to correct these defects by the addition of other materials, but the results obtained heretofore have not been very satisfactory. In most instances, the added materials have not been compatible with the film-forming materials in the proportions needed for the improvement. In other cases, the added materials have not brought about the desired increase in flexibility and the like.

It is an object of the invention, therefore, to provide new resinous compositions. It is a further object to provide new resinous compositions which are particularly useful and valuable in the formation of coating compositions. It is a further object to provide new compositions containing film-forming materials, such as acrylate polymers, vinyls and alkyd resins, urea, melamine and phenolic resins which give coatings having excellent flexibility and good water resistance. It is a further object to provide new and valauble compositions containing special epoxy-containing condensates. Other objects and advantages of the invention will be apparent from the following detailed description thereof.

It has now been found that these and other objects may be accomplished by the new compositions of the invention comprising a mixture of (1) a solvent soluble epoxy-containing reaction product of a polycarboxylic acid or anhydride with at least 1.5 times the chemical equivalent amount of a polyepoxide containing more than one vic-epoxy group, and (2) a dissimilar film-forming resinous product, and particularly an acrylate polymer, vinyl polymer, urea, melamine and phenolic resins, and alkyd resin. It has been found that the above-described solvent soluble epoxy-containing reaction products have a surprisingly high degree of compatibility with synthetic resinous film-forming materials as noted above which have heretofore been incompatible with many additives. In addition, the resulting combination can be used to form surface coatings having outstanding flexibility and distensibility as well as good resistance to water and good adhesion.

The special epoxy-containing products used in the compositions of the invention comprising the reaction product of a polycarboxylic acid or anhydride with at least 1.5 times the chemical equivalent amount of a polyepoxide containing more than one vic-epoxy group. The polyepoxides used in preparing such condensates include those compounds having more than one vicinal epoxy group, i.e., more than one

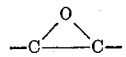

group. These componds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used to prepare the precondensates are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadieneoate, butyl 1,12,15-octadecatrienoate, butyl elostearate, monoglycerides of tung oil fatty acids, monoglycerides of fatty acids derived from soybean oil, sunflower, rapeseed, hempseed, sardine, cottonseed oil, and the like.

Another group of the polyepoxides used in making the precondensates include the epoxidized esters of unsaturated monohydric alcohols and polycarboxylic acids, such as, for example, di(2,3-epoxybutyl)adipate, di(2,3-epoxybutyl)oxalate, di(2,3-epoxyhexyl) succinate, di(2,3-epoxyoctyl)pimelate, di(2,3-epoxybutyl)phthalate, di(2,3-epoxyoctyl)tetrahydrophthalate, as well as the esters of epoxycyclohexenol and epoxycyclohexanol and polycarboxylic acids as, for example, di(2,3-epoxycyclohexylmethyl) adipate and di(2,3-epoxycyclohexylmethyl)cyclohexanedicarboxylate.

Another group of materials include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 2,3-epoxycyclohexylmethyl 2,3-epoxycyclohexanoate, and 3,4-epoxycyclohexyl 3,4-epoxyoctanoate, and the like.

Another group of materials having epoxy groups include epoxidized esters of unsaturated monocarboxylic acids and polyhydric alcohols, such as ethylene glycol di(2,3-epoxycyclohexanoate), glycerol tri-2,3-epoxycyclohexanoate) and pentanediol di(2,3-epoxyoctanoate).

Still another group of epoxy compounds include epoxidized derivatives of polyethylenically unsaturated polycarboxylic acids, such as, for example, dimethyl 8,9,12,13-diepoxyeicosanedioate, dibutyl 7,8,11,12 - diepoxyoctadecanedioate, dioctyl 10,11-diethyl-8,9,12,13 - diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl-5,6,10,11 - diepoxyoctadecyl succinate.

Still another group comprise the epoxidized polyesters, such as polyesters obtained by reacting unsaturated polycarboxylic acids and/or unsaturated polyhydric alcohols, such as, for example, polyesters of maleic anhydride and ethylene glycol, polyesters of tetrahydrophthalic anhydride and ethylene glycol, polyesters of phthalic anhydride and 1,4-butenediol and the like.

Another group comprises the epoxidized polymers and copolymers of diolefines, such as butadiene. Examples of this include, among others, butadiene-acrylonitrile copolymers, butadiene-styrene copolymers and the like.

Still another group includes the epoxidized hydrocarbons, such as epoxidized 2,2-bis(cyclohexenyl)propane, 2,2-bis(cyclohexenyl) butane, 8,10 - octadecadiene and the like.

The polycarboxylic acids and anhydrides used in preparing the condensates of the present invention comprise carboxylic acids (and their anhydrides) which contain at least 2 and preferably 2 to 6 carboxyl groups. The acids may be saturated, unsaturated, aliphatic, cycloaliphatic or aromatic and may be substituted with substituents, such as OH groups, chlorine atoms, ether radicals and the like. Examples of the acids include, among others, adipic acid, suberic acid, azelaic acid, succinic acid, chlorosuccinic acid, octadecylsuccinic acid, dodecylsuccinic acid, phthalic anhydride, isophthalic anhydride, terephthalic acid, and particularly the acids obtained by polymerizing unsaturated fatty acids, such as acids derived from drying and semidrying oils as linseed, soybean, perilla, oiticia, tung, walnut and dehydrated castor oil, as linoleic acid, linolenic acid, eleostearic acid, licanic acid and the like. The polymerization of such acids can be accomplished by conventional techniques such as use of heat, peroxides and the like. Normally, the polymerization is effected by utilizing the lower aliphatic esters of the unsaturated acids so as to prevent decarboxylation during the heating period, and then removing the ester groups through hydrolysis. This process is illustrated in the Industrial and Engineering Chemistry article page 1139, vol. 38 (1946). The structures of some of the polymerized acids are shown in Industrial and Engineering Chemistry, vol. 33, page 89 (1941).

Preferred acids are the dimerized or trimerized acids obtained from the ethylenically unsaturated fatty acids derived from semidrying and drying oils, and particularly, the conjugated fatty acids containing from 12 to 20 carbon atoms. The generic structure of the resulting trimerized acids is believed to be that of the following:

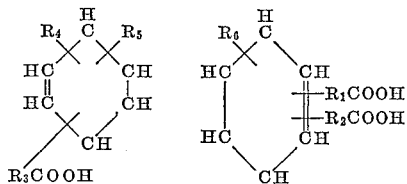

In the above formula, $R_1$, $R_2$ and $R_3$ constitute alkylene radicals having between 4 and 10 carbon atoms each while $R_4$, $R_5$ and $R_6$ are alkyl radicals having between 4 and 10 carbon atoms each. Normally, the product will have the generic formula as follows:

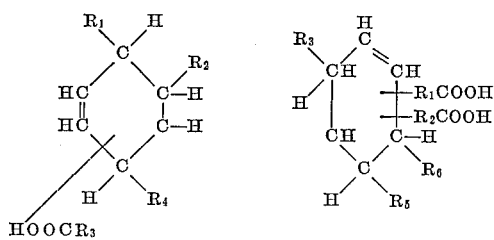

Particularly preferred acids to be employed in the preparation of the condensates of the present invention include the aliphatic, cycloaliphatic polycarboxylic acids containing at least 8 carbon atoms and preferably between 10 and 54 carbon atoms. Particularly preferred polycarboxylic acids are those containing at least 2 carboxyl groups and from 18 to 36 carbon atoms and particularly the dimerized and trimerized unsaturated fatty acids.

The amount of the polycarboxylic acid or anhydride and the polyepoxides to be employed is critical. Unless the proper proportions are utilized the resulting product will be an insoluble infusible product which cannot be used in the application. In order to obtain the desired soluble non-heat convertible epoxy containing condensates of the present invention, it is essential that the acidic component be reacted with at least 1.5 times the chemical equivalent amount of the polyepoxide as used herein and in the amount claimed. The expression of "chemical equivalent" in relation to the acidic and polyepoxide mixtures refers to the amount needed to furnish one epoxy group for every acidic group. Preferably the acidic component and the polyepoxide are combined in chemical equivalent ratios varying from 1:2 to 1:4.

It is usually desirable in mixing the components to add the acid slowly to the polyepoxide over a period of time in order to prevent the accumulation of a large concentration of the acid in any portion of the reaction mixture.

The reaction takes place without the use of additional catalytical components; however, it may be desirable to add small amounts of materials such as tertiary amines, quaternary ammonium salts and organo substituted phosphines in amounts varying from .01% to 3% by weight of the reactants to speed the formation of the condensates.

Temperatures employed in the reaction will generally vary from about 50° C. to 200° C. In most cases, the acidic component and the polyepoxide will be quite reactive and temperatures in the order of about 50° C. to 125° C. will be sufficient to effect the desired reaction. In other instances, it will be desirable to use higher temperatures such as those of from 100° C. to 175° C.

The reaction is preferably continued until substantially all of the polycarboxylic acid or anhydride has been consumed. This can be easily indicated by the determination of the acid number of the reaction mixture.

At the conclusion of the reaction, the reaction mixture can be used directly as such for the intended applications as noted hereinafter. If desired the condensates may be recovered by distillation, extraction and the like.

The condensates when separated from the reaction mixture will vary from viscous liquids to solid resins. The products will be substantially free of acidic groups and will contain more than one epoxy group. The products prepared from the acids as the acidic component will contain some free OH groups formed during the reaction, but those obtained from the anhydrides will be relatively free of formed OH groups. The new condensates will be soluble in solvents such as acetone, toluene, benzene, xylene and the like. The products will be of much higher molecular weight than the basic polyepoxide from which they are formed, and will contain at least 2 epoxy groups and preferably 2 to 5 epoxy groups. They are also fusible, e.g. do not harden at 100° C. for 2 days.

The products prepared from the above reaction may be described as having the formula

wherein R is derived from the polycarboxylic acid or anhydride by removing the carboxyl groups or anhydride groups, X is the residue of the polyepoxide having terminal groups and $n$ is an integer preferably ranging from 2 to 5.

The particularly preferred condensates are those derived from the polycarboxylic acids containing at least 2 carboxyl groups and the glycidyl polyethers of the polyhydric phenols. These particularly preferred condensates may be represented by the following formula

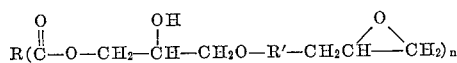

wherein R is derived from the polycarboxylic acid, R' is derived from the dihydric phenol used in making the glycidyl ethers and $n$ is an integer from 2 to 5.

The preparation of some epoxy-containing condensates by the method described above is illustrated by the following. Polyethers referred to below are those described in U.S. 2,633,454.

EPOXY-CONTAINING CONDENSATE A 384 parts of Polyether A and 296 parts of dimerized octadecadienoic acid were placed in a reaction flask and the mixture heated. When the temperature reached 120° C., 6.8 parts of methyl diethanolamine was added. Heating was continued for about 2 hours. The resulting product was a viscous liquid condensate having an epoxy value of .14 eq./100 g.

EPOXY-CONTAINING CONDENSATE B 57 parts of phthalic anhydride was dissolved in 300 parts of Polyether A by heating to 80° C. in a reaction flask equipped with stirrer, condenser and thermometer. The temperature was then increased to 100° C. and 3.6 parts of methyl diethanolamine was added causing the reaction to exotherm to a temperature of 154° C. Stirring was continued for four hours and the temperature dropped slowly to 100° C. where it was maintained until the end of the heating period. The resulting product was a brittle solid resin having an epoxy value of 0.313 eq./100 g., an OH value of 0.09 and an acidity of 0.007.

EPOXY-CONTAINING CONDENSATE C 300 parts of Polyether A and 72 parts of sebacic acid anhydride were placed in a flask described above and the mixture heated at 100–110° C. to dissolve the mixture. Heat was turned off and 3.6 parts of methyl diethanolamine was added at 105° C. The temperature increased rapidly to 136° C. The mixture was cooled to 100° C. and maintained at that temperature for 3½ hours with stirring. The resulting product was a viscous liquid having an epoxy value of 0.213 eq./100 g.

EPOXY-CONTAINING CONDENSATE D 768 parts of Polyether A was placed in a reaction flask and 46 parts of isophthalic acid added at room temperature. 8 parts of methyl diethanol amine was then added and heat applied to raise the temperature to about 140° C. 120 parts of isophthalic acid was then added in small increments over a 30 minute period. The mixture was then stirred for 1 hour at 150° C. The resulting product was a brittle solid having an epoxy value of 0.217 eq./100 g.

EPOXY-CONTAINING CONDENSATE E 300 parts of Polyether A and 50 parts of dodecenylsuccinic anhydride was placed in a reaction flask. The mixture was heated to 60° C. to dissolve the anhydride. 3.6 parts of methyl diethanol amine was then added and the mixture heated to 115° C. with continuous addition of 50.3 parts of the anhydride. The reaction exothermed to 155° C. and then the temperature dropped to 125° C. where it was maintained for 4 hours. The resulting product was a viscous liquid having an epoxy value of 0.276 eq./100 g. and a hydroxy value of 0.112.

The component to be combined with the above-described epoxy-containing condensates include the dissimilar synthetic film-forming materials, such as the polymers of the ethylenically unsaturated monomers, such as the acrylates, vinyl halides, vinylidene halides, styrenes, nitriles, and the like, polyamides, polyesters, polyurethanes, urea resins, phenolic resins, melamine resins, epoxidized oils, alkyd resins, and the like, and mixtures thereof. These resins may be of the thermosetting type, i.e., containing groups which act to cross-link the polymer, or may be merely thermoplastic resins.

Preferred materials to be used include the acrylate polymers, such as polymers of alkyl acrylates or methacrylates, such as methyl acrylate, ethyl acrylate, butyl acrylate, methyl methacrylate, butyl methacrylate, cyclohexyl methacrylate and the like. These monomers may be polymerized alone or in combination with other unsaturated monomers, such as styrene, alpha-methylstyrene, butadiene, isoprene, chloroprene, cyclopentadiene, ethylene, butylene, vinyl chloride, acrylonitrile, dimethyl maleate, ethylene glycol diacrylate, acrylamide, methacrylamide, N-ethyl acrylamide and the like, and mixtures thereof. Especially preferred acrylate polymers to be employed include the copolymers of one or more of the alkyl acrylates or methacrylates, a styrene compound and an acrylic acid derivative containing a functional group, such as an acrylamide, hydroxyethyl ester of acrylic acid, N-methylol acrylamide, and the like, and mixtures thereof. Particularly preferred are the thermosetting acrylates prepared from an acrylic or methacrylate acid ester and a monomer containing a functional group which may either be the cross-linking reaction, such as the hydroxyethyl esters and the N-methylol acrylamides.

Also preferred are the vinyl polymers containing units of vinyl halides or vinylidene halides and other polymerizable monomers. Examples of these include the copolymers of vinyl chloride and vinyl acetate, vinyl chloride and acrylic acid, vinyl chloride and dimethyl maleate, vinyl chloride and acrylonitrile, vinyl chloride and methyl methacrylate and the like, and mixtures thereof.

Another preferred group comprises the alkyd resins which may be modified or unmodified and of the long, short or medium modified type. Examples of such alkyd resins include the esters prepared from polyhydric alcohols, such as glcerol, pentaerythritol, sorbitol, 1,2,6-hexanetriol, 1,2,5-hexanetriol, 1,3,6-trimethylolbenzene, trimethylolpropane, polyallyl alcohol, polyvinyl alcohol and the like, and mixtures thereof, and polycarboxylic acids or anhydrides, such as phthalic anhydride, succinic anhydride, maleic anhydride, tetrahydrophthalic anhydride, 1,4-cyclohexanedicarboxylate, 2,2-bis(4-carboxyphenyl) propane, tetrachlorophthalic anhydride, adipic acid, sebasic acid, and the like. The modifying agent employed in the preparation of the alkyds include the monohydric alcohols and monocarboxylic acids as the drying oil, semi-drying oil and non-drying oil acids, p-tert-butyl-benzoic acid, toluic acid, benzoic acid, hexeneoic acid, chlorobenzoic acid and the like. Preferred alkyds are those modified with from 15% to 80% by weight of the higher fatty acids. The alkyd resins may be prepared by conventional cooking techniques, such as described in Ellis—"Synthetic Resins"—vol. 2, p. 862.

Another preferred group comprise the phenol-aldehyde resins, such as obtained by reacting formaldehyde or other aldehydes, such as acetaldehyde, isobutylraldehyde, 2-ethylhexaldehyde, acrolein, acrotonaldehyde and the like, with phenols which may be monohydric or polyhydric as phenol, resorcinol, 2,2-bis(4-hydroxyphenyl) propane, chlorophenol, tert-butylphenol cresol, xylenol, cardanol, naphthol, diphenylolmethane and the like. Preferred phenolic resins are the A-stage products obtained by condensing a phenol with a molecular excess of formaldehyde in the presence of a small amount of base, such as sodium or barium hydroxide, under mild temperature conditions so that the methylolphenols predominate in the product.

Still another preferred group comprises the urea-aldehyde and melamine aldehyde resins obtained by reacting melamine or substituted melamines and the ureas, as urea, thiourea and substituted ureas with aldehydes, such as formaldehyde, according to conventional procedures.

Another preferred group of film-forming resins include the polyurethanes obtained by reacting organic polyisocyanates or isothiocyanates with materials containing active hydrogen atoms, such as polyhydric alcohols, polymercaptans, polycarboxylic acids, polyamines and the like. Preferred polyurethanes include those obtained by reacting aliphatic, cycloaliphatic and aromatic diisocyanates with polyhydric alcohols, such as the polymerized alkylene oxides, polyvinyl alcohols, polyallyl alcohols, polypentaerythritols, 1,2,6-hexanetriol, glycerol and the like. Other examples of polyurethanes and their preparation are described in U.S. 2,511,544; 2,692,873; 2,692,874; and 2,702,797.

Still another preferred group comprises the polythio polymercaptans, and particularly those of the formula

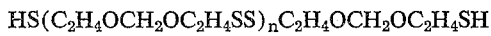

which are obtained, for example, by reacting dimercapto diethyl formal with hydrogen peroxide as described in Patrick—U.S. 2,466,963.

Still another preferred group comprises the liquid polymers obtained by polymerization of polyolefins, such as butadiene, isoprene and the like, alone or in admixture with other components, such as styrene, acrylonitrile, acrylates and the products obtained by airblowing the polymers or by reacting with a peracid, such as peracetic acid.

Still another group consists of the cellulosic derivatives such as the cellulosic ether, esters and ether esters, such as, for example, cellulose nitrate, cellulose acetate, ethyl cellulose and the like.

Another preferred group comprises the polymethylol phenol ethers and preferably the alkenyloxy-substituted methylol benzenes as described in U.S. 2,894,931.

The compositions of the invention can be prepared by merely mixing the above-described components together in any order. The amount of the epoxy-containing condensate and the amount of the dissimilar film-forming component employed in the composition may vary over a considerable range depending on the application intended. In general, the amount of the epoxy-containing component will vary from about 1% to 99% and more preferably from 15% to 90% by weight of the combined mixture.

Solvents or diluents may be employed if desired. Suitable solvents or diluents include the liquid hydrocarbons, such as benzene, toluene, xylene, cyclohexane, cyclopentane, cyclohexene, and the like, and other materials, such as methyl isobutyl ketone, methyl ethyl ketone, dibutyl ether, diamyl ether, cyclohexanone, alcohols, ether-alcohols, as ethylene glycol monoethyl ether, and the like and mixtures thereof.

If one desired a cross-linked product and if the dissimilar film-forming materials do not contain functional groups which are reactive with the material itself or with the epoxy-containing condensate, one may add a curing agent for the film, forming material and/or the epoxy-containing material. Examples of such materials include, among other, acidic, neutral or alkaline materials, as alkalies as sodium or potassium hydroxides; alkali phenoxides like sodium phenoxide; carboxylic acids or anhydride, such as formic acid, oxalic acid or phthalic anhydride; dimer or trimer acids derived from unsaturated fatty acids as described above, 1,20-eicosanedioic acids, and the like; Friedel-Crafts metal halides like aluminum chloride, zinc chloride, ferric chloride or boron trifluoride as well as complexes thereof with ethers, acid anhydrides, ketones, diazonium salts, etc.; salts, such as zinc fluoborate, magnesium perchlorate and zinc fluosilicate; phosphoric acid and partial esters thereof including n-butyl orthophosphate hexaethyl tetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, N-aminoethylpiperazine tetramethyl piperazine, N,N - diethyl-1,3-propanediamine, 1,2-diamino-2-methylpropane, 2,3-diamino-2-methylbutane, 2,4-diamino-2-methylpentane, 2,4-diamino-2,6-dimethyloctane, dibutylamine, dinonylamine, distearylamine, diallyl amine, dicyclohexylamine, ethylcylohexylamine, o-tolylnaphthylamine, pyrrolidine, 2 - methylpyrrolidine, tetrahydropyridine, 2-methylpiperidine, 2,6-dimethylpiperidine, diaminopyridine, tetramethylpentane, metaphenylene diamine, and the like, and soluble adducts of amines and polyepoxides and their salts, such as described in U.S. 2,651,589 and U.S. 2,640,037.

Preferred curing agents are the polycarboxylic acids and acid anhydrides, the primary and secondary aliphatic, cycloaliphatic and aromatic amines and adducts of these amines and polyepoxides. In addition, urea-formaldehyde, melamine-formaldehyde and phenol-formaldehyde resins can also be used to cure the compositions of the invention, particularly when baked coatings are desired.

The amount of the curing agent employed may vary widely. In general, the amount of the curing agent will vary from about 0.5% to 200% by weight of the polyepoxide. The tertiary amines and $BF_3$- complexes are preferably employed in amounts varying from about 0.5% to 20% and the metal salts are preferably employed in amounts varying from about 1% to 15%. The secondary primary amines, acids and anhydrides are preferably employed in at least .8 chemical equivalent amounts, i.e., chemical equivalent amount refers to that amount to furnish one amine hydrogen or one anhydride group for every epoxy group. Preferred amounts vary from .8 to 2 equivalents of curing agent per epoxy equivalent.

If the composition is to be employed as a coating composition where it is desired to effect the curing at ambient temperatures agents which as employed are preferably aliphatic, cycloaliphatic, primary and secondary amines such as diethylene triamine ethylene diamine, soluble adducts of polyamines and monoepoxides, soluble adducts of polyepoxides and polyamines and amino containing polyamides such as those obtained by reacting polymerized unsaturated fatty acids with aliphatic polyamines and the like. If heat can be employed in the cure of the composition other types of epoxy curing agents may be employed such as polycarboxylic acids and anhydrides, boron trifluoride complexes metal salts and the like. These components are employed in the amounts described herein above for the curing agents.

When used as coatings, the compositions of the invention may be applied to any surface, but are particularly suitable for use as surfacing compositions for concrete, asphalt, wood, and steel. The concrete may be of any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner as brushing, spraying and the like. If material is thick or contains enert particles as sand, etc., the material may best be applied by use of a screed, trowel, shovel or broom. The coating may vary from a few mils thickness to about 1/16 inch or even 1/2 inch.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight. Polyethers referred to are those described in U.S. 2,633,458.

*Example 1*

This example illustrates the preparation and some of the properties of a composition containing epoxy condensate A (as described above), an acrylate polymer made from about 50% styrene, 25% methyl methacrylate and 25% methyl methacrylamide and containing melamine.

80 parts of the above-described acrylate polymer containing 2 parts of melamine and dissolved and xylene was combined with 20 parts of epoxy condensate A which was also dissolved in xylene, the resulting mixture having a solid content of 60%. This mixture was applied to tin panels to form a thin coating. After baking at 300° F. for 30 minutes the coating was hard and tough and had good flexibility.

*Example II*

This example illustrates the preparation and some of the properties of a composition containing epoxy condensate A and a vinyl halide-vinylacetate-maleic acid copolymer.

80 parts of a vinyl halide-vinylacetate-maleic acid copolymer (86–13–1 ratio) was combined with 20 parts of epoxy condensate A dissolved in xylene, the resulting mixture having a solids content of about 60%. This mixture was applied to tin panels to form a thin coating. After baking at 300° F. for 30 minutes, the coating was hard and tough and had good flexibility.

*Example III*

This example illustrates the preparation and some of the properties of a composition containing epoxy condensate A and a vinyl halide polymer.

50 parts of a copolymer of vinyl chloride and vinyl acetate (87:13 ratio) described in methyl isobutyl ketone was mixed with 50 parts of epoxy condensate A dissolved in xylene, the resulting mixture having a solids content of 60%. This mixture was applied to tin panels to form a thin coating. After baking at 300° F. for 10 minutes, the coating was tough and had good flexibility.

*Example IV*

This example illustrates the preparation and some of the properties of a composition containing epoxy condensate A and an alkyld resin prepared from glycerolphthalic anhydride and coconut fatty acid—30% modified.

50 parts of the above-described alkyld resin dissolved in xylene was combined with 50 parts of the epoxy condensate A, the resulting mixture having a solids content of 67%. This mixture was spread on tin panels and baked for 30 minutes at 300° F. The resulting films were homogeneous and had good flexibility and strength.

*Example V*

Example IV was repeated with the exception that 80 parts of the epoxy condensate A was combined with 20 parts of a melamine-formaldehyde resin (Cymel 245-8) and 2 parts butyl hydrogen phosphate. The coatings were baked at 300° C. for 30 minutes. The films were hard, tough and flexible.

*Example VI*

Example IV was also repeated with the exception that 80 parts of the epoxy condensate was combined with 20 parts of a polyvinyl butyral having a molecular weight of about 3000. After drying, the resulting films were hard and were flexible.

*Example VII*

Example IV was repeated with the exception that 80 parts of the epoxy condensate was combined with 20 parts of a urea-formaldehyde resin (Beckamine PO96) and 2 parts of butyl hydrogen phosphate. After baking at 300° F. for 30 minutes, the resulting films were hard and tough.

*Example VIII*

50 parts of epoxy condensate A in xylene was combined with 50 parts of a rosin-modified phenol-formaldehyde resin (Amberal F-7). The mixture was applied to tin panels to form a thin coating. After drying, the coating was hard and tough.

*Example IX*

Example IV was repeated with the exception that 80 parts of the epoxycondensate was combined with 20 parts of ester gum. The resulting films were hard and tough.

*Example X*

20 parts of an unvulcanized styrene-butadiene rubber containing 30% styrene was dissolved in xylene and combined with 80 parts of epoxy condensate A dissolved in xylene, the resulting mixture having a solids content of about 50%. This mixture was applied to tin panels and dried. The resulting coating was homogeneous and had good flexibility.

*Example XI*

20 parts of epoxidized polybutadiene was combined with 80 parts of epoxy condensate A dissolved in xylene and 20 parts of diethylene triamine. The mixture was applied to tin panels and cured at 100° C. The resulting coating was hard and tough and had good flexibility.

*Example XII*

20 parts of a polythiopolymercaptan having a molecular weight of about 2000 and a formula such as

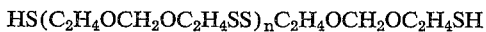

is combined with 80 parts of epoxy condensate A in xylene. The resulting mixture is applied to tin panels and cured at 100° C. The resulting coatings are hard and tough and have good flexibility.

*Example XIII*

Examples I to X are repeated with the exception that epoxy condensate A is replaced by each of the following: Epoxy condensate B, epoxy condensate C and epoxy condensate D. Related results are obtained.

*Example XIV*

Example IV was repeated with the exception that 3.1 parts of diethylene triamine per 100 parts of adduct was included. The resulting coatings were hard and tough and flexible.

We claim as our invention:

1. A composition comprising a mixture of (1) a solvent soluble epoxy-containing reaction product of an acidic component of the group consisting of polycarboxylic acids and polycarboxylic acid anhydrides, with at least 1.5 times the chemical equivalent amount of a polyepoxide containing more than one vic-epoxy group, and (2) an acrylate polymer, the amount of the epoxy-containing reaction product making up from 15% to 90% by weight of the combined mixture.

2. A composition comprising a mixture of (1) an acetone-soluble epoxy-containing condensate of a polycarboxylic acid containing from 2 to 5 carboxyl groups and from 12 to 80 carbon atoms, with at least 1.5 times the chemical equivalent amount of a polyepoxide containing more than one vic-epoxy group, and (2) an acrylate polymer, said epoxy-containing condensate making up from 15% to 90% by weight of the combined mixture.

3. A composition as in claim 1 wherein the polyepoxide is a glycidyl polyether of a polyhydric compound of the group consisting of polyhydric phenols and polyhydric alcohols.

4. A composition as in claim 1 wherein the polyepoxide is a glycidyl polyether of 2,2-bis(4-hydroxyphenyl)propane.

5. A composition as in claim 1 wherein the polyepoxide is an epoxidized polyethylenically unsaturated compound possessing at least one internal epoxy group.

6. A composition comprising a mixture of (1) a solvent soluble epoxy-containing reaction product of a polymerized unsaturated fatty acid with at least 1.5 times the equivalent amount of a glycidyl polyether of a polyhydric phenol, and (2) an acrylate polymer, the amount of the epoxy-containing condensate making up from 15% to 90% by weight of the combined mixture.

7. A composition comprising a mixture of (1) a solvent soluble epoxy-containing reaction product of a polymerized unsaturated fatty acid with at least 1.5 times the equivalent amount of a glycidyl polyether of 2,2-bis-(4-hydroxyphenyl)propane, and (2) an acrylate polymer, said epoxy-containing condensate making up from 15% to 90% by weight of the combined mixture.

References Cited by the Examiner
UNITED STATES PATENTS

| | | | |
|---|---|---|---|
| 2,700,030 | 1/55 | Widmer et al. | 260—831 |
| 2,910,455 | 10/59 | Christenson et al. | 260—831 |
| 3,065,195 | 11/62 | Vasta | 260—837 |
| 3,070,564 | 12/62 | Roeser | 260—837 |

MURRAY TILLMAN, *Primary Examiner.*

LEON J. BERCOVITZ, JAMES A. SEIDLECK,
*Examiners.*